United States Patent [19]

Fournier, Jr. et al.

[11] 4,166,081

[45] Aug. 28, 1979

[54] METHOD OF MAKING GRAFT POLYMERS

[75] Inventors: Albert A. Fournier, Jr., Martinsville; Charles F. Paddock, Wayne, both of N.J.

[73] Assignee: Uniroyal, Inc., New York, N.Y.

[21] Appl. No.: 858,060

[22] Filed: Dec. 5, 1977

Related U.S. Application Data

[60] Division of Ser. No. 329,003, Feb. 2, 1973, abandoned, which is a continuation of Ser. No. 22,364, Mar. 24, 1970, abandoned.

[51] Int. Cl.² ...................... C08L 51/04; C08L 51/06; C08F 255/06
[52] U.S. Cl. ........................................ 525/75; 525/78; 525/83; 525/84; 525/87; 525/86
[58] Field of Search .................................... 260/876 R

[56] References Cited

U.S. PATENT DOCUMENTS

| | | | |
|---|---|---|---|
| 3,435,096 | 3/1969 | Limbert et al. | 260/878 R |
| 3,483,273 | 12/1969 | Prucmal et al. | 260/878 R |
| 3,489,821 | 1/1970 | Witt et al. | 260/876 R |
| 3,538,190 | 11/1970 | Meredith et al. | 260/878 R |
| 3,538,191 | 11/1970 | Meredith et al. | 260/878 R |
| 3,538,192 | 11/1970 | Bishop, Sr. | 260/878 R |
| 3,642,950 | 2/1972 | O'Shea | 260/878 R |
| 3,657,395 | 4/1972 | Meredith et al. | 260/878 R |
| 3,671,608 | 6/1972 | Meredith et al. | 260/878 R |
| 3,683,050 | 8/1972 | Meredith et al. | 260/876 R |
| 3,876,727 | 4/1975 | Meredith et al. | 260/878 R |

FOREIGN PATENT DOCUMENTS

| | | |
|---|---|---|
| 635024 | 8/1963 | Belgium . |
| 675120 | 1/1966 | Belgium . |
| 6704109 | 10/1967 | Netherlands . |
| 917498 | 2/1963 | United Kingdom . |
| 1009719 | 11/1965 | United Kingdom . |

*Primary Examiner*—Alan Holler
*Attorney, Agent, or Firm*—James J. Long

[57] ABSTRACT

Graft copolymers of resin-forming monomers on monoolefin-type rubber spines, particularly ethylene-propylene-non-conjugated diene rubber spines, are made in solution with the aid of a free radical polymerization initiator. The graft copolymers have high impact strength.

1 Claim, No Drawings

METHOD OF MAKING GRAFT POLYMERS

This is a division of application Ser. No. 329,003, filed Feb. 2, 1973, now abandoned, which is a continuation of Ser. No. 22,364, filed Mar. 24, 1970, now abandoned.

This invention relates to an improved method of preparing graft copolymers based on ethylene-propylene copolymers, in which category we include ethylene-propylene bipolymers and ethylene-propylene-diene terpolymers. In particular it relates to an improved grafting technique used to make the graft polymer portion of a gum plastic comprising a resin portion and a graft polymer portion. Grafting of monomers onto rubber spines that contain little or no unsaturation ordinarily requires the additional step of providing grafting sites on the spine before polymerization. Highly unsaturated spines such as polybutadiene do not require this extra step since the double bonds already present in the polymer chain provide the grafting sites. As an indication of the relative amounts of unsaturation, the iodine number (grams of iodine which combine with 100 grams of polymer) of a highly unsaturated rubber such as polybutadiene is theoretically 470 while that of a saturated rubber is 0. Ethylene-propylene terpolymers contain unsaturation in the end groups but the amount of unsaturation is low as shown by the iodine number range of about 5 to 25.

The prior art methods used to provide grafting sites on saturated polymer spines before carrying out the graft polymerization are: (a) peroxidation, by heating a solution of the rubber spine in the presence of molecular oxygen and an organic peroxide or hydroperoxide, (b) irradiation of the polymer spine with high energy radiation, and (c) strong shearing action, e.g., as on a rubber mill. As a more detailed example of pretreatment the following procedure was necessary. In order to obtain the peroxide-containing elastomers, the ethylene-propylene bipolymer or ethylene-propylene-diene terpolymer was dissolved in cumene together with cumene hydroperoxide, and air was bubbled through the cement. The rubbery material then had to be separated from the solvent by precipitation with methanol and dried before it could be employed in the preparation of the graft copolymer with the desired monomer or monomers.

We find that, unexpectedly, the pre-treatment is not necessary when the graft polymerization is carried out in solution with the aid of conventional free radical producing peroxide initiators. The unusually high impact-strengths, obtained with this process, are unexpected in light of impact values obtained by other processes for equivalent rubber levels.

In the practice of this invention a cement (i.e., a solution) of the rubbery copolymer or terpolymer in an inert organic solvent is prepared and to the cement is added the desired amount of resin-forming monomer or monomers (e.g. styrene and acrylonitrile) and an appropriate radical source. The mixture is then heated in order to decompose the peroxide and polymerize the monomer. The grafted material is isolated in the usual manner by precipitation with methanol and if desired mixed with additional resin to produce a gum plastic with a desired resin to rubber ratio.

The rubber spine used in the graft polymerization results from the copolymerization of a monomer mixture comprising two or more alpha-monoolefins, with or without a minor proportion of diolefin. If a diolefin is used, the amount should be so limited that the rubbery copolymer has an iodine number not greater than about 25; this will generally correspond to not more than about 12% by weight of diolefin monomer units in the copolymer.

The alpha-monoolefins used in making the rubbery copolymer are those having the formula $CH_2=CHR$, in which R may be hydrogen atom or a saturated alkyl radical, such as methyl, ethyl, n-propyl, isopropyl, etc. Preferred rubbery copolymers are those in which the alpha-monoolefins used are ethylene and propylene, the weight ratio of ethylene monomer units to propylene monomer units in the copolymer being from 20/80 to 80/20, preferably between 35/65 and 65/35.

Diolefins suitable for use in making the rubbery copolymer are non-conjugated straight-chain or cyclic diene hydrocarbons which are copolymerizable with the alpha-monoolefins. Examples of suitable diolefins are straight or branched chain diolefins, such as those in which both double bonds are terminal as in 1,4-pentadiene, 1,5-hexadiene, 2-methyl-1,5-hexadiene, 3,3-dimethyl-1,5-hexadiene, 1,7-octadiene, 1,9-decadiene, 1,19-eicosadiene, and the like; diolefins in which only one double bond is terminal such as 1,4-hexadiene, 1,9-octadecadiene, 6-methyl-1,5-heptadiene, 7-methyl-1,6-octadiene, 11-ethyl-1,11-tridecadiene and the like. Also suitable are the bridged-ring diene hydrocarbons of a similar nature containing 7 to 10 carbon atoms, especially those containing a methano or an ethano bridge, for example: (a) unsaturated derivatives of bicyclo [2,2,1] heptane containing at least two double bonds, including bicyclo [2,2,1] hepta-2,5-diene; dicyclopentadiene (also named 3a, 4, 7, 7a-tetrahydro-4,7-methanoindene), tricyclopentadiene, tetracyclopentadiene and such 5-alkylidene-2-norbornenes as 5-methylene-2-norbornene and 5-ethylidene-2-norbornene; (b) unsaturated derivatives of bicyclo [2,2,2] octane containing at least two double bonds, including bicyclo [2,2,2] octa-2,5-diene; (c) unsaturated derivatives of bicyclo [3,2,1] octane containing at least two double bonds; (d) unsaturated derivatives of bicyclo [3,3,1] nonane containing at least two double bonds; (3) unsaturated derivatives of bicyclo [3,2,2] nonane containing at least two double bonds, and the like. Dicyclopentadiene, 1,4-hexadiene, and methylene or ethylidene norbornylene are preferred.

Methods for making these rubber copolymers are well known, and need not be described herein (see e.g., U.S. Pat. Nos. 3,000,866; 3,000,867; 2,933,480).

Monomers, suitable for use in the invention include olefinic monomers such as styrene, the halo-styrenes (e.g. para-chlorostyrene), alpha-methylstyrene, p-methylstyrene, acrylonitrile, methacrylonitrile, acrylic acid, methacrylic acid, the lower alkyl (1–8 carbon atoms) esters of acrylic and methacrylic acids (e.g., methyl acrylate, methyl methacrylate), vinyl chloride, and many others (alone or in mixtures of two or more). Monomers of particular interest are styrene; vinyl chloride; methyl methacrylate; mixtures of styrene-acrylonitrile, of styrene-methyl methacrylate, of styrene-methacrylic acid; similar mixtures of alpha-methylstyrene; and mixtures of styrene-alpha-methylstyrene.

As stated above, the graft copolymer is made by polymerizing the resin-forming monomers in the presence of the rubbery ethylene-propylene copolymer, with the result that substantial part of the newly-polymerized resin-forming monomer is attached to the rubber molecules.

Conventional methods of solution polymerization are used. The solvent chosen is such as to substantially dissolve the spine polymer; aromatic solvents such as benzene are preferred. The initiators for the graft polymerization are peroxides with the preferred peroxides being di-tertiary butyl peroxide and tertiary butyl peroxypivalate.

Our method of evaluating the usefulness of the graft polymer (and indirectly the grafting efficiency) is to mix the graft polymer with a suitable resin (a resin that is compatible with the graft polymer, normally the resin monomers are the same as those grafted onto the rubber spine) and measuring the impact properties. If no grafting occurs during the polymerization the product will be merely a physical blend of the rubber spine and the polymerized monomer or co-monomers. The Izod impact strength of physical blends of either ethylene-propylene bipolymers or ethylene-propylene terpolymers with the resin used in gum plastics are extremely low, approximately 0.2 ft. lbs./in. of notch. The gum plastics made from graft polymers of this invention show increased impact resistance over the physical blends. We have shown conclusively that grafting does occur, as illustrated by example. This involves extraction of the graft polymer with a solvent for the resin portion. If all the resin is not extracted the unextracted amount must be grafted onto the rubber spine.

The proportion of resin-forming monomer to rubber used in the grafting reaction may vary over quite a wide range, depending upon factors such as the efficiency of grafting (i.e., the proportion of polymerized resin-forming monomer actually attached to the rubber), and the particular resin-graft copolymer system in question.

It is desired to emphasize that the advantages of the invention are not obtainable simply by blending the described resin with the ungrafted rubber itself, which in general is not compatible with the resin. While it is not desired to limit the invention to any particular theory of operation, it appears to be possible that the grafting of a portion of the resin onto the rubber, as described, causes better interfacial adhesion between the rubber phases with the resinous portion. This appears to contribute to the good impact properties. Whatever the explanation, the observed fact is that the present blend of resin with graft copolymer is remarkably superior to an otherwise similar blend of the resin with the ungrafted rubber. The proportion of resin-forming monomers to rubber used in the graft polymerization to achieve this result may vary in general from about 1:4 to about 4:1. Provided that there is enough monomer actually grafted onto the rubber to confer compatibility, this proportion is not critical. Proportions between 1:2 and 2:1 are usually satisfactory. Any amount of monomer produces some grafting and is operable in the graft copolymerization.

Methods which are commonly used and are well-known in free radical emulsion polymerization for increasing the rate of conversion may also be employed here. This includes particularly the incremental addition of the free radical catalyst. This technique may be used to advantage in a continuous polymerization process. In this technique a long tubular reactor or a series of polymerization reactors may be employed, through which the reaction mixture is passed continuously, with continuous or intermittent addition of reactants at appropriate stages; a final product stream may be withdrawn continuously from the system.

The graft copolymer need not necessarily be blended with separately prepared resin to achieve a high impact gum plastic material, that is, an amount of resin-forming monomers sufficient to give the desired final over-all ratio of resin-to-rubber may be employed in the graft polymerization process in the first instance. However, it is ordinarily more economical to supply a portion of the resinous component as separately prepared resin, rather than make all of the resin component in the grafting step.

The compositions made by the method of the invention have outstanding thermal stability and in admixture with materials which absorb ultra-violet light have good weather resistance, relative to impact plastics based on diene rubbers.

The following examples illustrate the practice of the invention. All ratios and parts are by weight.

EXAMPLE 1

Grafting on ethylene-propylene bipolymer

1A. An ethylene-propylene bipolymer (46/54 weight ratio of ethylene/propylene, Iodine no.=0) was dissolved in benzene to make a cement containing 7.5% by weight of the polymer. A stainless steel bomb was charged with 435 g. of cement together with 51 g. of styrene and acrylonitrile (70:30 weight ratio styrene:acrylonitrile) and 1 g. of di-tertiary-butyl peroxide. After sealing, the bomb was placed in a 127° C. oven overnight. The bomb was cooled, opened, and the product isolated by precipitation with methanol in a Waring Blendor. The yield was 67.2 g. of a white powdery material which represented a 68% conversion of monomers.

To evaluate the product of the polymerization enough styrene-acrylonitrile resin (70:30 weight ratio styrene:acrylonitrile) was added to the above product to give a final ratio of 75/25 styrene:acrylontrile/ethylene:propylene.

1B. For comparison a physical blend was made of the ethylene:propylene bipolymer and the styrene:acrylonitrile resin with the same 75/25 resin:rubber ratio. In this case there was no graft polymerization attempted. The large difference in impact strength

|  | 1A | 1B |
|---|---|---|
| Notched Izod, ft-lbs/in. of notch | 12.4 | 0.2 | we attribute to the polymerization of the resin forming monomers in the presence of the rubber spine 1C. 667 Parts of a 6% by weight solution of an ethylene-propylene bipolymer in benzene was heated for 26 hrs. at 120° C. after the addition of 0.6 parts of di-tertiary-butyl peroxide, 42 parts of styrene and 18 parts of acrylonitrile. The conversion of monomers was 69% of 60 parts charged.

51 Parts of this product was mixed with 49 parts of a 70:30 styrene:acrylonitrile resin on a mill at 340° F. for 10 minutes. The gum plastic impact strength was 4.3 ft-lbs./inch of notch.

EXAMPLE 2

40 Parts of an ethylene-propylene-dicyclopentadiene terpolymer with an iodine no. of 6 was mixed with 532 parts of benzene to make a cement. 42 Parts of styrene, 18 parts of acrylonitrile and 0.6 parts of di-tertiary-butyl peroxide were added and the polymerization carried out at 120° C. for 24 hrs. The conversion was 85.7% which resulted in a product containing a ratio of 56/44 resin portion/rubber portion.

To check on the effectiveness of the graft polymerization 57.1 parts of the product was blended with 42.9 parts of a 70:30 styrene:acrylonitrile resin on a hot mill. the notched Izod value of this gum plastic was 9.5 ft-lbs./inch. In contrast sample 2B, a blend of ungrafted rubber and resin has poor impact.

|  | 2A | 2B |
|---|---|---|
| Graft polymer (39.2:16.8:44 styrene: acrylonitrile:EPDM) | 57.1 | 0 |
| Rubber (ethylene:propylene: dicylopentadiene) | 0 | 25 |
| Resin (70:30 styrene: acrylonitrile) | 42.9 | 75 |
| Impact resistance, ft-lbs./in. | 9.5 | 0.2 |

EXAMPLE 3

As an additional proof of the existence of grafting, an extraction test was run on a graft polymer made by reacting a mixture of:

|  | Parts by weight |
|---|---|
| ethylene:propylene:dicyclopentadiene (42:51:7) | 40 |
| benzene | 667 |
| styrene | 42 |
| acrylonitrile | 18 |
| di-tertiary butyl peroxide | 0.6 |

The reaction was carried out at 120° C. for 24 hrs. with an 80% conversion of the resin monomers. A 0.5 g. sample of the product was sheeted on a mill to a 10 mil. thickness and shaken for 3 days while in contact with 50 cc. of acetone. If this extraction test is run on physical blends of rubber and resin all the resin is extracted after three days. However the graft polymer of this example, after three days extraction with acetone, had 29% of the resin portion still unextracted.

EXAMPLE 4

4A. Using the same method of polymerization as in the previous examples styrene and acrylonitrile were grafted onto an ethylene:propylene:1,4-hexadiene terpolymer with an iodine no. of about 13.

|  | Parts |
|---|---|
| ethylene propylene terpolymer | 40 |
| styrene | 42 |
| acrylonitrile | 18 |

After 24 hrs. at 120° C. 85% of the monomers had polymerized. 44 parts of the graft polymer were blended on a hot mill with 56 parts of a 70:30 styrene:acrylonitrile resin. The notched Izod value of 11.2 ft-lbs./in. indicates the presence of grafted polymer.

4B. Using the same method of polymerization as in 4A styrene and acrylonitrile were grafted onto an ethylene:propylene:5-methylene-2-norbornene terpolymer of 5.8 Iodine no. The ratios of monomers and polymer were as in 4A. After 26 hrs. at 120° C., 85% of the monomers had polymerized. 44 Parts of the graft were blended on a hot mill with 56 parts of a 70:30 styrene:acrylonitrile resin. The notched Izod value was 13.9 ft-lb./in.

4C. Using essentially the same method of polymerization as in 4A styrene and acrylonitrile were grafted onto an ethylene:propylene:5-ethylidene-2-norbornene terpolymer with an iodine number of about 16.

|  | Parts |
|---|---|
| ethylene propylene terpolymer | 43 |
| styrene | 43 |
| acrylonitrile | 14 |

After 19 hours at 120° C., 46% of the monomers had polymerized. The graft (29.6 parts) was blended on a hot mill with a 70:30 styrene:acrylonitrile resin (70.4 parts). The notched Izod value was 4.1 ft-lbs./in.

EXAMPLE 5

To illustrate the applicability of the invention to other monomer combinations the following polymerizations were run.

|  | Parts by Weight | | | |
|---|---|---|---|---|
|  | 5A | 5B | 5C | 5D |
| Ethylene:propylene: dicyclopentadiene (44:53:3) Iodine no. = 6 | 40 | 40 | 40 | 40 |
| Styrene | 60 | 51 | 20 | 40 |
| Methacrylic acid |  | 9 |  |  |
| Methyl methacrylate |  |  | 40 | 20 |
| di-tertiary butyl peroxide | 0.6 | 0.6 | 0.6 | 0.6 |
| Benzene | 627 | 627 | 627 | 627 |
| Conversion of monomers after 24 hrs. at 120° C. | 78 | 40 | 53 | 72 |
| Resin/rubber in graft polymer | 54/46 | 37/63 | 44/56 | 52/48 |

To each of these graft polymers enough resin was added to make the total resin/rubber ratio 75/25. The resins and amounts added are as follows:

|  | Parts by Weight | | | |
|---|---|---|---|---|
|  | 5A | 5B | 5C | 5D |
| Graft polymer | 54 | 40 | 45 | 52 |
| Styrene:α-methyl styrene resin (80:20) | 46 |  |  |  |
| Styrene:methacrylic acid resin (85:15) |  | 60 |  |  |
| Styrene:methyl methacrylate resin (33:67) |  |  | 55 |  |
| Styrene:methyl methacrylate resin (67:33) |  |  |  | 48 |
| Notched Izod impact resistance ft-lbs./in. | 1.0 | 0.7 | 2.7 | 2.6 |

EXAMPLE 6

To illustrate the use of solvents other than benzene for the solution polymerization the following graft polymerizations were carried out.

6A. A solution of 40 parts of an ethylene:propylene:-dicyclopentadiene terpolymer (7.4 Iodine number) in 324 g. of commercial n-hexane was mixed with 42 parts of styrene, 18 parts of acrylonitrile and 1 part of di-tertiary-butyl peroxide. After 24 hours at 120° C. the monomers were 92% converted to polymer.

60 Parts of the graft polymer was hot milled with 40 parts of a 70:30 styrene:acrylonitrile resin. The impact resistance, measured by notched Izod, was 1.8 ft-lbs./in.

6B. A 6% solution of an ethylene:propylene:dicyclopentadiene terpolymer (6.0 Iodine number) in toluene containing 40 parts of polymer was mixed with 42 parts of styrene, 18 parts of acrylonitrile and 0.6 parts of di-tertiary butyl peroxide. After 24 hours at 120° C. the monomers were reacted at 73% conversion.

52 Parts of the graft polymer was hot milled with 48 parts of a 70:30 styrene:acrylonitrile resin. The impact resistance was 0.8 ft-lbs./in.

6C. The procedure of 6B was carried out in chloroform for 22 hrs. at 120° C. with a conversion of 94%. After blending with resin to a 75/25 resin/rubber ratio the impact strength was 1.0 ft-lbs./in.

EXAMPLE 7

To illustrate the use of various initiators in the grafting reaction the following polymerizations were carried out:

|  | 7A | 7B | 7C | 7D | 7E | 7F | 7G | 7H |
|---|---|---|---|---|---|---|---|---|
| (Ethylene:propylene:dicyclopentadiene)terpolymer (7.4 Iodine no.) | 40 | 40 | 40 | 30 | 40 |  |  |  |
| (Ethylene:propylene:dicyclopentadiene)terpolymer (6 Iodine no.) |  |  |  |  |  | 40 | 40 | 40 |
| Benzene | 627 | 627 | 627 | 627 | 627 | 627 | 627 | 627 |
| Styrene | 42 | 42 | 42 | 49 | 42 | 42 | 42 | 42 |
| Acrylonitrile | 18 | 18 | 18 | 21 | 18 | 18 | 18 | 18 |
| tertiary butyl hydroperoxide | 0.6 |  |  |  |  |  |  |  |
| para-menthane hydroperoxide |  | 0.6 |  |  |  |  |  |  |
| di-cumyl peroxide |  |  | 0.6 |  |  |  |  |  |
| Benzoyl peroxide |  |  |  | 0.7 |  |  |  |  |
| tertiary butyl peroxypivalate |  |  |  |  | 0.6 |  |  |  |
| 2,5-dimethyl-2,5-di(t-butylperoxy)-hexane |  |  |  |  |  | 0.6 |  |  |
| di-tertiary-butyl diperpthalate (as 50% soln. in dibutyl phthalate) |  |  |  |  |  |  | 0.6 |  |
| tertiary butyl perbenzoate |  |  |  |  |  |  |  | 0.6 |
| Reaction time, hrs. | 24 | 24 | 24 | 24 | 24 | 24 | 24 | 24 |
| Reaction temp. °C. | 120 | 120 | 120 | 58 | 60 | 120 | 120 | 120 |
| % conversion of monomers | 71 | 67 | 79 | 24 | 44 | 79 | 70 | 60 |
| Resin/rubber in graft | 51/49 | 50/50 | 54/46 | 36/64 | 40/60 | 54/46 | 51/49 | 48/52 |

The graft polymers were hot milled with enough of a 70/30 styrene/acrylonitrile resin to make an overall 75/25 resin/rubber mix.

|  | Parts by Weight | | | | | | | |
|---|---|---|---|---|---|---|---|---|
|  | 7A | 7B | 7C | 7D | 7E | 7F | 7G | 7H |
| Graft | 52 | 50 | 55 | 39 | 42 | 55 | 51 | 48 |
| styrene:acrylonitrile resin | 48 | 50 | 45 | 61 | 58 | 45 | 49 | 52 |
| Notched Izod, ft-lbs./in. | 2.4 | 0.9 | 0.9 | 1.0 | 7.2 | 2.0 | 2.6 | 2.0 |

EXAMPLE 8

To illustrate the influence of the ratio of rubber spine in the graft:

|  | 8A | 8B | 8C | 8D |
|---|---|---|---|---|
| (ethylene:propylene:dicyclopentadiene)-terpolymer (7.4 Iodine no.) | 30 | 35 | 40 | 50 |
| Benzene | 750 | 875 | 667 | 833 |
| Styrene | 49 | 45.5 | 42 | 35 |
| Acrylonitrile | 21 | 19.5 | 18 | 15 |
| di-tertiary butyl peroxide | 0.7 | 0.65 | 1.0 | 0.5 |
| Reaction temperature, °C. | 120 | 120 | 120 | 120 |
| Reaction time, hrs. | 24 | 24 | 24 | 24 |
| % Conversion of monomers | 76 | 69 | 71 | 61 |
| resin/rubber ratio in graft polymer | 64/36 | 56/44 | 52/48 | 38/62 |

The graft polymers were hot milled with sufficient resin (70:30 styrene:acrylonitrile) to give an overall ratio in the gum plastic of 75/25 resin/rubber.

|  | Parts by Weight | | | |
|---|---|---|---|---|
|  | 8A | 8B | 8C | 8D |
| Graft polymer | 70 | 57 | 52 | 40 |
| Styrene:acrylonitrile resin | 30 | 43 | 48 | 60 |
| Notched Izod, ft.-lbs./in. | 2.6 | 11.0 | 12.6 | 8.2 |

EXAMPLE 9

This example demonstrates the necessity of the catalysts for grafting of the monomers to the ethylene:propylene:dicyclopentadiene chain.

An ethylene:propylene:dicyclopentadiene terpolymer (62-9-14) of 6.0 iodine no. in benzene solution, 40 grams of such terpolymer in 532 g. of benzene, is mixed with 42 parts of styrene and 18 parts of acrylonitrile. After 98 hours at 120° C. the monomers are 31.7% converted to polymer.

67.8 parts of the above polymer is hot-milled with 32.2 parts of a 70:30 styrene:acrylonitrile resin to make a final 75/25 resin/rubber ratio. The impact resistance, measured by notched-Izod method is 0.4 ft/lbs. This indicates that in the absence of catalyst, grafting does not occur, that is, mere thermal effects do not induce grafting. If grafting had occurred, the impact resistance would have been significantly higher than the 0.4 ft-lb. value obtained. It should also be noted that the polymerization reaction without catalyst is very slow, with only 31.7% conversion after 98 hours.

Having thus described our invention, what we claim and desire to protect by Letters Patent is:

1. A method of making a high impact modified plastic comprising
    (A) interpolymerizing in an organic solvent and in the presence of a free radical catalyst 1 to 2 parts by weight of a rubbery polymer of ethylene, at least one monoolefin containing 3–5 carbon atoms and at least one polyene for each 2 to 1 parts by weight of monomeric material which is a mixture of an alkenyl aromatic monomer and an acrylic monomer, the organic solvent being a solvent for the rubbery polymer and being an aromatic solvent selected from the group consisting of benzene and toluene, the alkenyl aromatic monomer being selected from the group consisting of styrene, alpha-methylstyrene, p-methylstyrene and the halo-styrenes, and the acrylic monomer having the general formula

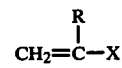

wherein R is selected from the group consisting of hydrogen and methyl and X is selected from the group consisting of

wherein R' is an alkyl group containing 1–8 carbon atoms, the said polymer, prior to interpolymerization, having not more than 13 carbon to carbon double bonds per 1000 carbon atoms, and
    (B) thereafter mixing the graft interpolymer resulting from step (A) with additional resin separately prepared from said mixture of monomeric material to provide a higher overall ratio of resin to rubbery polymer.

* * * * *